H. F. STRATTON.
OVERLOAD APPARATUS FOR ALTERNATING CURRENT MOTORS.
APPLICATION FILED MAY 19, 1919.
1,431,135.
Patented Oct. 3, 1922.
2 SHEETS—SHEET 1.
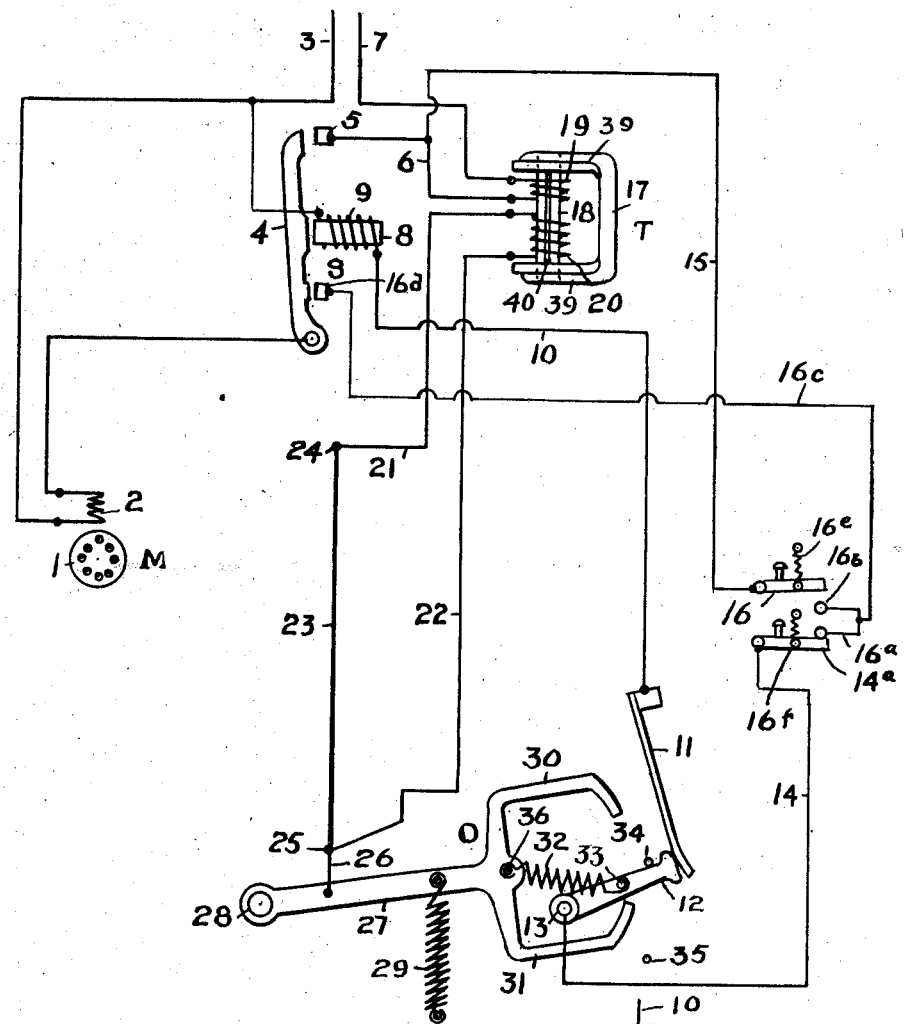
Fig.1
Fig.2
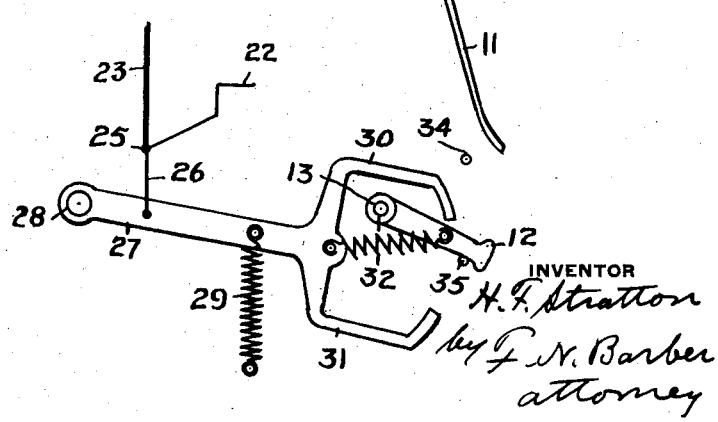
WITNESSES
R.F.Dilworth
INVENTOR
H. F. Stratton
by F. N. Barber
attorney H. F. STRATTON.
OVERLOAD APPARATUS FOR ALTERNATING CURRENT MOTORS.
APPLICATION FILED MAY 19, 1919.
1,431,135.
Patented Oct. 3, 1922.
2 SHEETS—SHEET 2.
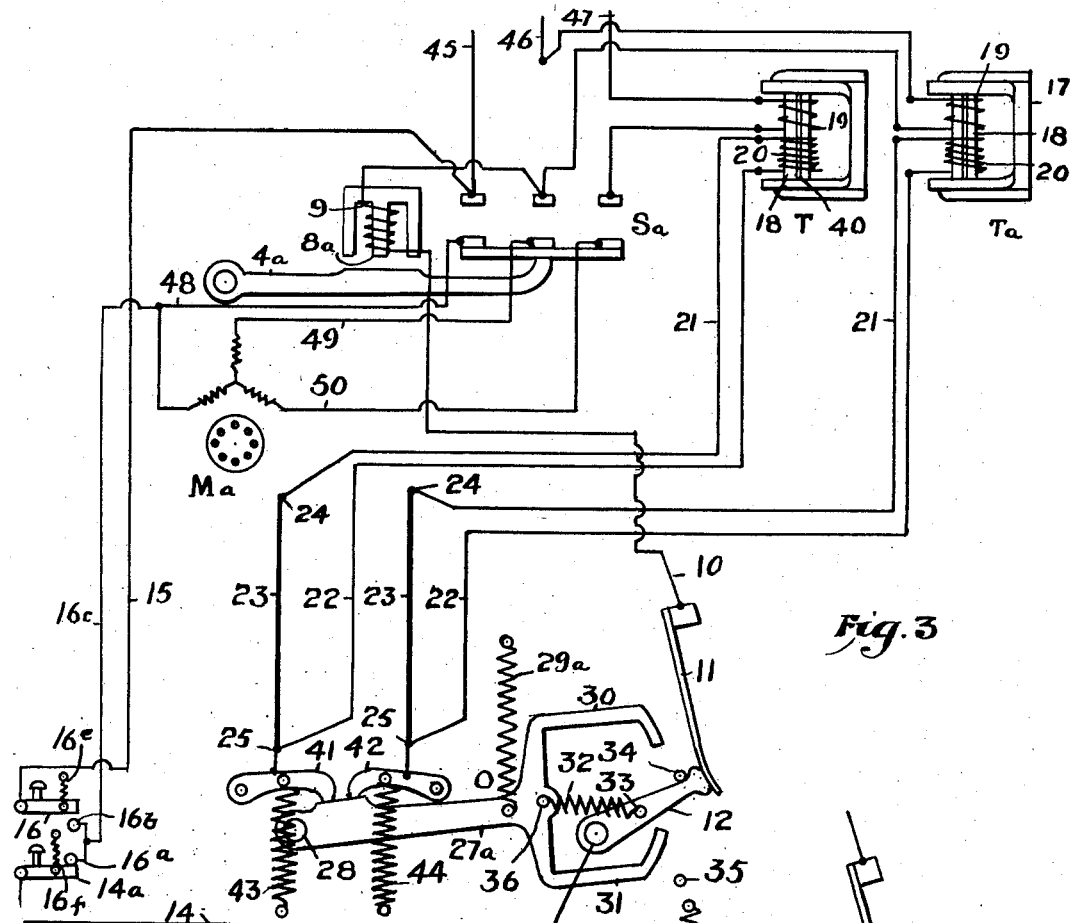
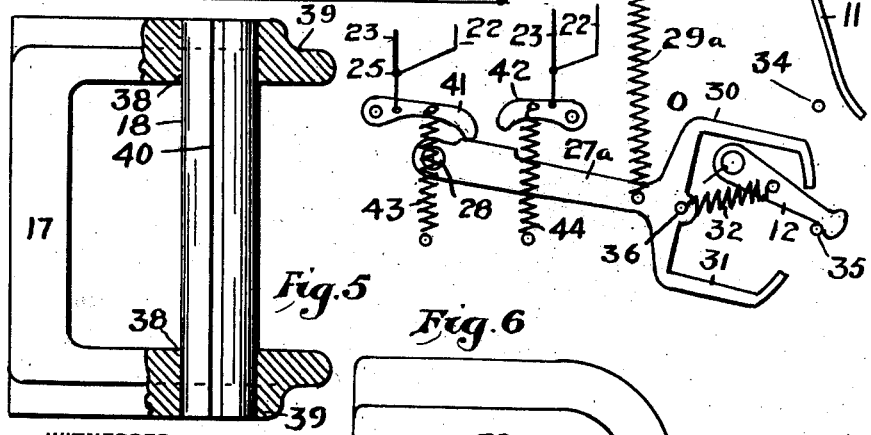
WITNESSES
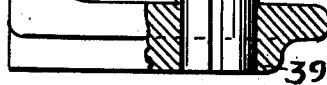
INVENTOR
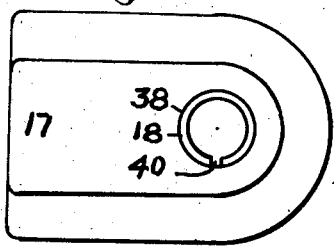

Patented Oct. 3, 1922.

1,431,135

UNITED STATES PATENT OFFICE.

HARRY F. STRATTON, OF CLEVELAND, OHIO, ASSIGNOR TO THE ELECTRIC CONTROLLER & MANUFACTURING COMPANY, OF CLEVELAND, OHIO, A CORPORATION OF OHIO.

OVERLOAD APPARATUS FOR ALTERNATING-CURRENT MOTORS.

Application filed May 19, 1919. Serial No. 298,194.

*To all whom it may concern:*

Be it known that I, HARRY F. STRATTON, a citizen of the United States, residing at Cleveland, in the county of Cuyahoga and State of Ohio, have invented new and useful Improvements in Overload Apparatus for Alternating-Current Motors, of which the following is a specification.

My invention relates to overload apparatus for alternating current motors and particularly for induction motors.

To start an induction motor, an overload device which carries the starting current, which may be from four to six times full-load current, must not trip during the time, usually from five to ten seconds, required to accelerate the motor. Overload devices whose time of tripping is controlled by an expansive wire carrying the motor current and which are adjusted to trip at moderate overloads in forty seconds, for example, would trip before the said time for acceleration elapsed. It is the principal object of this invention to provide an overload apparatus of the hot-wire type which will not, when starting current is applied to induction motors, operate during the normal time required for acceleration. This and further objects will be explained hereinafter.

Referring to the accompanying drawings, Fig. 1 is a diagrammatic representation of one form of my invention applied to a single-phase motor; Fig. 2, a view of the overload switch of Fig. 1 in its open position; Fig. 3, a diagrammatic view of a second form of my invention, applied to a three-phase motor; Fig. 4, a view of the overload switch in its open position; Fig. 5, a side view, partly in section, showing a transformer which I prefer to use; and Fig. 6, an end view of Fig. 5.

On Fig. 1 of the drawings, M designates a single-phase alternating-current motor, which may be arranged in the well-known way to start as a repulsion motor and run as an induction motor. As my invention does not relate to the adjuncts required to give such a motor a starting torque, I have omitted the same. The symbol M stands for a motor having the usual or any suitable means for ensuring a starting torque. The motor M has the rotor 1 and the stator windings 2. One terminal of these windings is connected to the supply line 3, and the other terminal to the movable contact member 4 of the main switch S. The fixed contact member 5 of this switch is connected by the wire 6 to the remaining supply line 7. The switch S has the core 8 energized by the winding 9 in series with the wire 10 which connects the fixed contact member 11 of the overload switch O to the line 3. The movable contact member 12 of the switch O, pivoted at 13, is connected by the wire 14 to the movable contact 14ᵃ of the maintaining push-button switch. The wire 15 connects the movable contact 16 of the starting push-button switch to the line 7. The fixed contacts 16ᵃ and 16ᵇ for the respective contacts 14ᵃ and 16 are connected by the wire 16ᶜ to the fixed contact of the auxiliary switch 16ᵈ which is closed and opened by the switch-member. The contact 14ᵃ is normally closed by a spring 16ᶠ and the contact 16 is normally held open by a spring 16ᵉ.

T is a transformer having the magnetic frame 17, the magnetic core 18 and the primary and secondary windings 19 and 20 on the core. The primary winding is in series with the contact 5 and the supply line 7, and the secondary winding is in a loop comprising the wires 21 and 22 and the hot-wire element 23, having its terminal 24 fixed while its terminal 25 is connected by the wire 26 to the lever 27 having one end pivoted at 28. When the wire 23 is not heated, it holds the lever 27 upwardly against the tension of the spring 29 to the position shown on Fig. 1. The remaining or free end of the lever 27 is forked, having one member 30 above the contact member 12 and the other member 31 below the same. The central portion of the lever 27 just before its fork has the pin 36, which is connected by the contractile spring 32 to the pin 33 intermediate between the pivot 13 and the outer end of the member 12, which may oscillate between the stops 34 and 35. While the wire 23 is lengthening by the effect of electric current therein, the spring 29 pulls the lever 27 downwardly. Soon after the pin 36 passes the line including the pivot 13 and the pin 33, the spring 32 quickly snaps the contact member 12 from its position against the stop pin 34 and the contact member 11, as shown on Fig. 1, to the position shown on Fig. 2, where the member 12 has left the contact 11 and has engaged the stoppin 35. The parts are so proportioned that, if the spring 32 is broken or for any other reason fails to move the member 12 to its open position shown on Fig. 2, the fork-member 30 will engage the member 12 and move it away from the member 11 to its lower position. Similarly the fork member 31 will, when the wire 23 contracts, engage the member 12 and move it to its upper or closed position in case the spring 32 is broken or fails to operate it soon after the pin 36 passes above the pivot 13.

The switch member 16 having been moved into engagement with the contact 16$^b$, current flows from the supply line 3 through the winding 9, the wire 10, the contacts 11 and 12 of the switch O, the wire 14, the contacts 14$^a$, 16$^a$, 16$^b$, and 16, the wire 15, the wire 6, and the primary winding 19 of the transformer T to the supply line 7. The current in this circuit energizes the core 8 which draws the movable member 4 of the switch S to its fixed member 5, whereupon the motor windings 2 receive current through the supply line 7, the primary winding 19, the switch S, and the supply line 3. As soon as the member 4 engages its contact 5, the contact 16 may be released, as the winding 9 then receives current through the contacts 14$^a$ and 16$^a$, the wire 16$^c$, the auxiliary contacts 16$^d$, the switch S, the wire 6, the winding 19, and the supply wire 7. The alternating current in the primary winding 19 induces in the secondary winding 20 an alternating current which traverses the hot-wire element 23.

In Figs. 3 and 4, I have shown my invention adapted to a three-phase induction motor. I employ two transformers T, T$a$, having their primaries connected in different phases of the motor circuit. The overload switch O is controlled by the levers 41 and 42 connected, respectively, to the lower ends of the two hot-wire elements 23. These levers bear at their free ends on the top of the lever 27$^a$ between its pivot 28 and its forked end. Springs 43 and 44 tend to pull the levers 41 and 42 downwardly or toward the lever 27$^a$. The spring 29$^a$ tends to pull the lever 27$^a$ upwardly against the action of the springs 43 and 44. The expansion of either of the wires 23 will permit either the spring 43 or the spring 44 to pull the lever O down in the direction for tripping the switch 12 as on Fig. 1. Fig. 4 shows that the left-hand wire 23 has permitted the spring 43 to move the lever O so as to open the switch 12. As the wire 23 contracts it lifts the lever 41 and permits the spring 29$^a$ to pull the trip-lever O upwardly in the direction for closing the switch 12. The expansion of both wires 23 would permit both springs 43 and 44 to pull the trip-lever O down, but the spring 29$^a$ could not move the lever O upwardly as long as an overload remained in either of the two connected phases.

The switch contact 16 having been moved so as to engage the contact 16$^b$, current will flow from the supply line 45 through the wire 15, the contacts 16, 16$^b$, 16$^a$, and 14$^a$, the wire 14, the switch contacts 12 and 11, the switch winding 9, and the winding 19 of the transformer T$a$ to the supply line 46. This causes the armature or switch member 4$^a$ to close and connect the supply lines 45, 46, and 47 to the motor leads 48, 49, and 50 of the motor M$a$, the primary winding of the transformer T$a$ being in the line 46 and that of the transformer T in line 47. The transformers T and T$a$ when their primary windings are energized cause alternating current to flow in the loops including the hot-wire elements 23.

Assume that one of the hot-wires 23 (Figs. 3 and 4) is in series with the motor current, that when the current reaches and maintains 125% of full-load current, the overload switch O will be opened in 40 seconds; and that, to start the motor, a starting current of 500% full-load current is required for 5 seconds. As the heat produced in the wire varies as the square of the current and the elongation of the wire varies as its temperature, the elongation of the wire varies as the square of the current. The time required to heat the wire until it elongates a definite amount varies inversely as the square of the current. As the starting current has been assumed to be four times the current that opens the switch O in 40 seconds, the starting current will cause the wire 23 to elongate so as to open the switch O in $\frac{1}{16}$ of the time that it would have required the current of 125% full-load current to open it, that is, the starting current would cause the overload switch O to open in 2½ seconds, whereas under the assumption the starting current should have been permitted to flow for five seconds to accelerate the motor. In order to lengthen the time the starting current may exist without opening the overload switch, I use the transformer T having special characteristics and place the wire 23 in the secondary circuit thereof.

The transformer T comprises the U-shaped frame 17 having the transformer core 18 extending into the openings 38 in the legs 39 thereof. The core 18 is a hollow steel cylinder with a slot 40 extending preferably from end to end thereof, and is of such dimensions as to be inadequate to transform high values of primary current, such as are used in starting, into proportional values in the secondary circuit, that is, the voltage and current generated in the secondary 20 and passing through the hot-wire 23 do not vary as much as the voltage and current vary in the primary 19. In one case, where the primary current varied about four to one, I found that the designing of the transformer so as to make the secondary current vary from a ratio of two to one was satisfactory. By varying the size of the core and the thickness of the core-wall; and otherwise proportioning the parts of the transformer, the increase of current in the secondary may be made as much less than the increase of current in the primary as desired.

From the described operation of the system of Figs 3 and 4, the operation of the system of Figs. 1 and 2 will be readily understood. In both systems the motor cannot be started, after the overload switch O has opened, without first closing the switch contacts 16 and 16ᵇ.

I claim:

1. The combination of an induction motor, a circuit therefor, a switch for the circuit, a winding for magnetically holding the switch closed against an opening force, an expansive wire, a transformer comprising a primary winding connected in said circuit and a secondary winding connected to said wire and means whereby said expansive wire when an overload exceeds a certain value, causes the time for demagnetizing said winding to be increased over the time which would ensue if the current in the wire were constantly equal or directly proportional to the current in the motor.

2. The combination of an induction motor, a circuit therefor, a switch for the circuit, a winding for magnetically holding the switch closed against an opening force, a circuit for the winding, a switch for opening the last circuit, an expansive wire for causing the last switch to open, a transformer having its primary winding in the motor circuit and its secondary winding in series with the wire, and means whereby, when an overload exceeds a certain value, the time required for the wire to expand so as to cause the last switch to open varies less than the inverse ratio of the square of the current in the primary winding.

3. The combination of an induction motor, a transformer, a switch biased to open when closed, a winding for magnetically holding the switch closed, a circuit for the motor, the circuit containing said switch and the primary winding of the transformer, a second circuit, a switch for closing and opening the second circuit and biased to open the circuit, the latter circuit containing the said holding winding, a wire in series with the secondary winding of the transformer and expansive by heat due to current therein to permit the biasing means to open the said second circuit, and means due to the construction of the magnetic circuit of the transformer for causing the wire to take longer or shorter times to expand, so as to allow the second switch to open depending on the characteristics of the overload.

4. The combination of an induction motor, a transformer, a switch biased to open when closed, a winding for magnetically holding the switch closed, a circuit for the motor, the circuit containing the said switch and the primary winding of the transformer, a second circuit, a switch for closing and opening the second circuit and biased to open the circuit, the latter circuit containing the said holding winding, a wire in series with the secondary winding of the transformer and expansive by heat due to current therein to permit the biasing means to open the said second circuit, and means due to the construction of the magnetic circuit of the transformer for causing the wire to take longer or shorter times to expand so as to allow the second switch to open depending on the characteristics of the overload, the said wire closing the switch upon its contraction to substantially its normal length.

5. The combination of an induction motor, a circuit therefor, a switch for the circuit, a winding for magnetically holding the switch closed against an opening force, a circuit for the winding, a switch for opening the last circuit, an expansive wire for causing the last switch to open, a transformer having its primary winding in the motor circuit and its secondary winding in series with the wire, and means whereby, when an overload exceeds a certain value, the time required for the wire to expand so as to cause the last switch to open varies less than the inverse ratio of the square of the current in the primary winding, the said wire closing the switch upon its contraction to substantially its normal length.

Signed at Cleveland, Ohio, this 15th day of May, A. D. 1919.

HARRY F. STRATTON.